(12) United States Patent
Ozawa et al.

(10) Patent No.: US 7,742,187 B2
(45) Date of Patent: Jun. 22, 2010

(54) IMAGE FORMING APPARATUS, IMAGE FORMING METHOD AND RECORDING MEDIUM HAVING PROGRAM RECORDED THEREON

(75) Inventors: Masahiro Ozawa, Hachioji (JP); Fumihito Akiyama, Hachioji (JP)

(73) Assignee: Konica Minolta Business Technologies Inc., Tokyo (JP)

( * ) Notice: Subject to any disclaimer, the term of this patent is extended or adjusted under 35 U.S.C. 154(b) by 1058 days.

(21) Appl. No.: 11/391,913

(22) Filed: Mar. 29, 2006

(65) Prior Publication Data

US 2007/0146774 A1 Jun. 28, 2007

(30) Foreign Application Priority Data

Dec. 26, 2005 (JP) ............................ 2005-372453

(51) Int. Cl.
  *G06F 15/00* (2006.01)
  *B41J 5/30* (2006.01)
(52) U.S. Cl. ........................................ 358/1.16; 400/62
(58) Field of Classification Search ................ 358/1.15, 358/1.16, 1.14, 1.18, 1.12, 404, 444, 402, 358/1.1, 426.01, 504, 442, 502; 399/24, 399/10, 81, 82, 23, 162, 224; 707/27, 100; 382/209, 232; 400/61, 62, 76; 257/303, 257/306, 309; 715/201, 255
See application file for complete search history.

(56) References Cited

U.S. PATENT DOCUMENTS 6,084,687 A * 7/2000 Miyazaki et al. ........... 358/1.17
6,304,336 B1 * 10/2001 Sugaya ...................... 358/1.16
6,611,347 B1 * 8/2003 Okada et al. ............... 358/1.15
2005/0206956 A1 * 9/2005 Hagiwara ................... 358/1.18
2006/0110200 A1 * 5/2006 Kujirai et al. ................ 400/76

FOREIGN PATENT DOCUMENTS

| JP | 08-102830 A | 4/1996 |
|---|---|---|
| JP | 2000-165634 A | 6/2000 |
| JP | 2003-134240 A | 5/2003 |
| JP | 2004-186930 A | 7/2004 |
| JP | 2004-358858 A | 12/2004 |

OTHER PUBLICATIONS

Japanese Office Action (and English translation thereof) dated Aug. 12, 2008, issued in a counterpart Japanese Application.

* cited by examiner

*Primary Examiner*—Saeid Ebrahimi Dehkordy
(74) *Attorney, Agent, or Firm*—Frishauf, Holtz, Goodman & Chick, P.C.

(57) ABSTRACT

An image forming apparatus including: a memory section having a common storage area that temporarily stores data in an intermediate form, which are generated on the way between image data in a form of page description language and data in a bitmap form obtained by interpreting the image data, and the data in a bitmap form; and a control section configured to monitor a first event that the data in an intermediate form stored in the common storage area have been deleted and a second event that the data in a bitmap form stored in the common storage area have been deleted, and to determine presence or absence of area for the data in an intermediate form to be stored when either of the first and second events occurs.

18 Claims, 12 Drawing Sheets

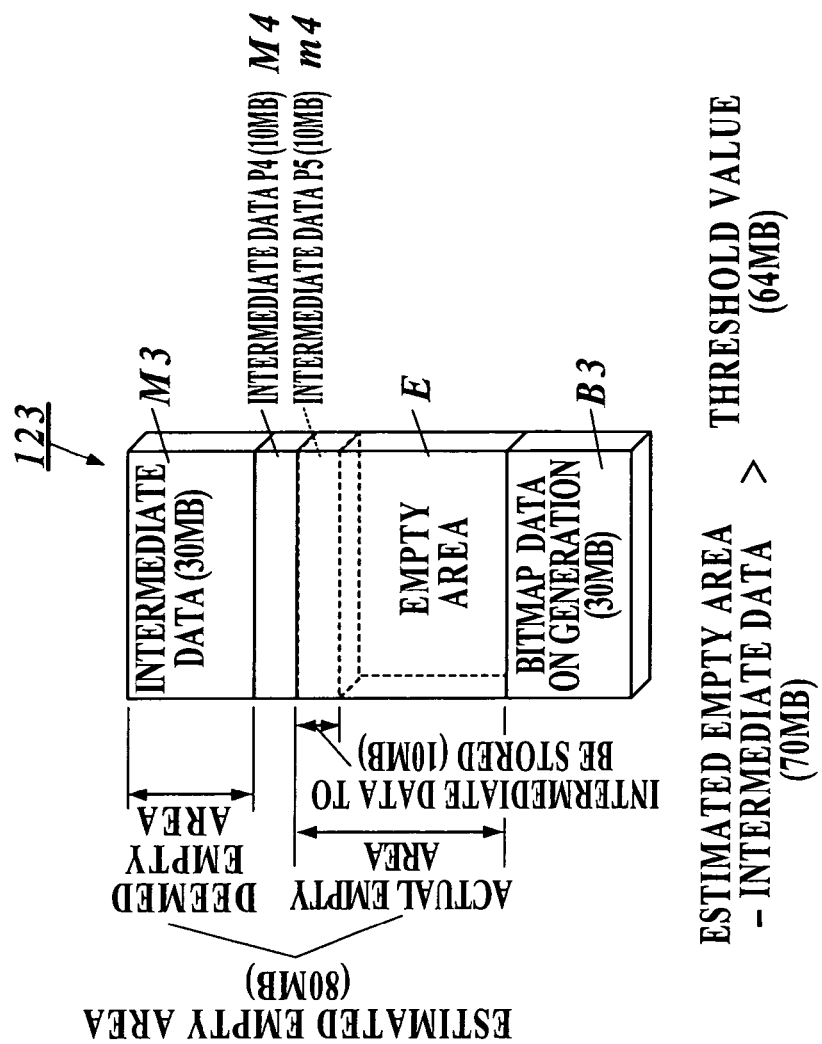
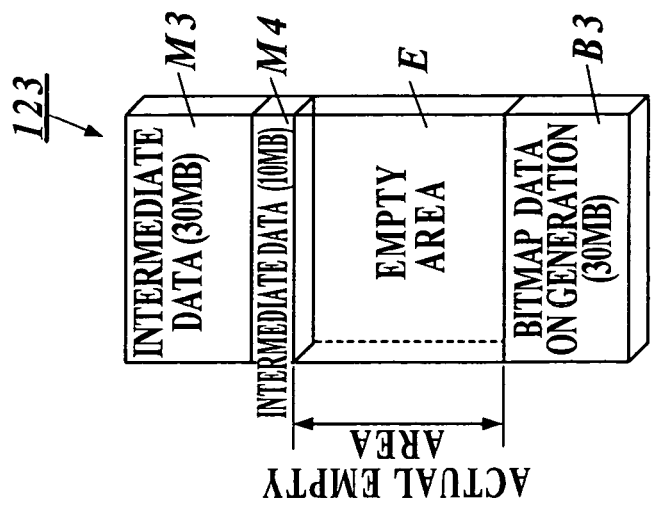

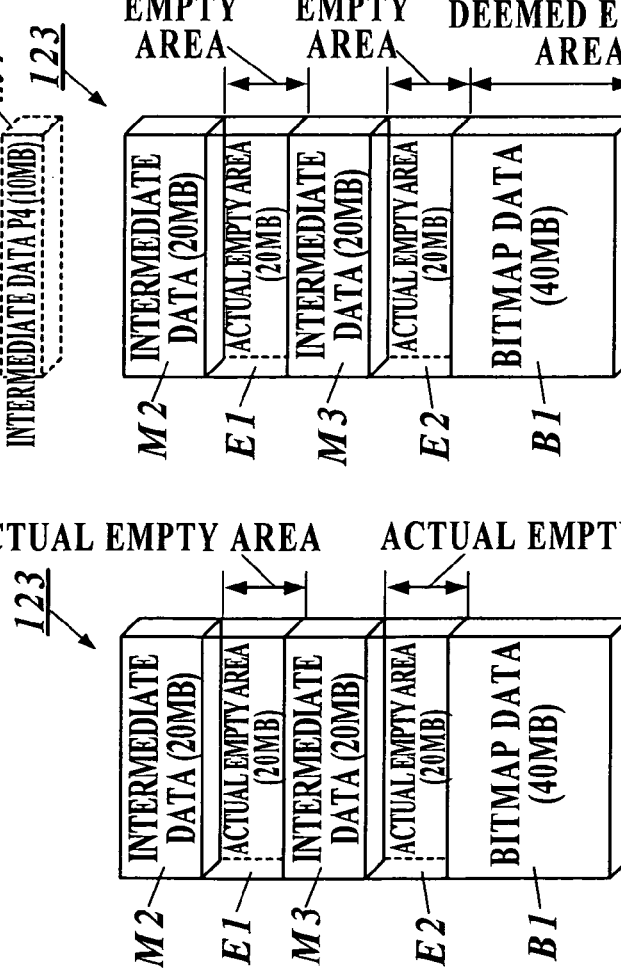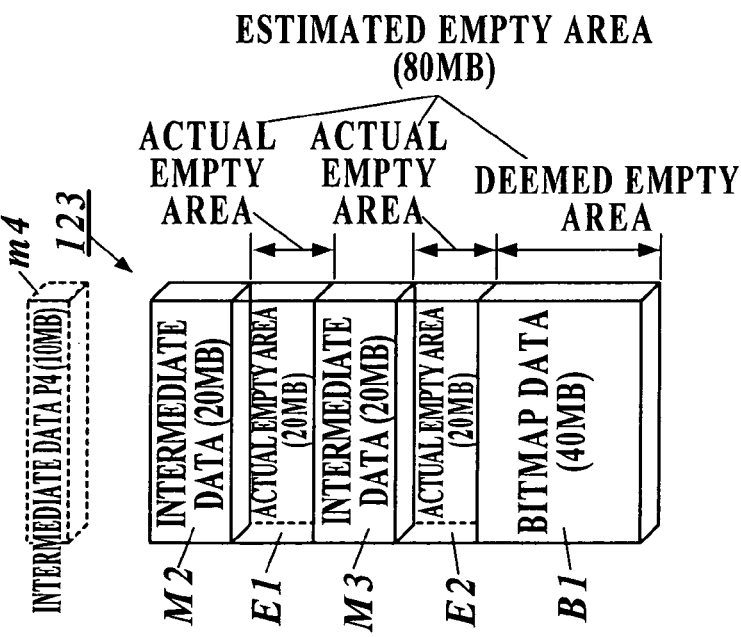

IMAGE FORMING APPARATUS, IMAGE FORMING METHOD AND RECORDING MEDIUM HAVING PROGRAM RECORDED THEREON

BACKGROUND OF THE INVENTION

1. Field of the Invention

The present invention relates to an image forming apparatus and an image forming method, in which data based on image data are stored in a memory, and a recording medium having a program recorded thereon.

2. Description of Related Art

Recently, there has been widely used an image forming apparatus, such as a network type of copier, printer, MFP (multifunction peripherals), etc. which receives print data, namely, image data in a form of PDL (Page Description Language), produced by an external device, e.g., a PC (Personal Computer), through a network, e.g., a LAN, converts the received print data temporarily into data in an intermediate form (intermediate data) to store in a memory, reads the stored intermediate data sequentially to convert into bitmap data, and then prints out. The PDL typically includes PostScript (TM) and PCL (Printer Control Language).

There is a demand for higher throughput in such an image forming apparatus for an increase of print data according as printing process speed has become higher. The apparatus has to hold print data until the printing has been completed, because when a certain error occurs, printing has to be resumed from the page where the error occurred. Further, when a memory has not an enough empty area, the memory cannot store new data and a memory-over error resultantly occurs. Accordingly, memory capacity needs to be increased for processing large data simultaneously and higher cost results, which leads to a problem.

In order to avoid such an increase of memory capacity, there has been applied processing of compression or the like to data to be stored for decreasing the memory capacity, but such a method needs additional processing for compressing process, which causes the throughput to be reduced.

There has been also adopted a method to improve efficiency for using a memory by managing intermediate data and bitmap data in a common memory with use of a threshold value. However, with this method, data is just held according to a simple compared result of determination as to whether the empty area of the memory is larger than the threshold value, and processing stops until the memory secures an empty area larger than the threshold value. This also leads to a problem of reducing the throughput.

Further, JP 2000-165634A discloses an apparatus that stores image data in a memory, the apparatus including a check means for checking whether the memory has an enough capacity of empty area to store the image data, and a data compression means that, when the check result by the check means is negative, selects data possible to delete or compress out of the data stored already in the memory and either deletes or compresses the selected data.

However, in the above-described technique, when the memory is short of empty areas, the apparatus determines existence of bitmap data in the midst of printing process, deletes the data after completion of the output in case that the data exists, and compresses the data possible to be compressed (intermediate data converted to bitmap data) to produce an empty area in case that the bitmap data does not exist. Therefore, a chance to produce the empty area by deleting the data is substantially limited to the time after completion of printing process. In case that the data does not exist, data compression processing is executed, which causes a problem of necessitating process time. As a result, the apparatus needs time for securing an empty area in the memory and has difficulty in achieving high throughput.

SUMMARY

In view of the above-described problems, an object of the invention is to provide an image forming apparatus, an image forming method and a recording medium having a program recorded thereon, which can achieve highly efficient use of memory and improve throughput.

In order to solve the above-described problem, an image forming apparatus reflecting an embodiment according to a first aspect of the invention is presented. The image forming apparatus comprises: a memory section having a common storage area that temporarily stores data in an intermediate form (intermediate data), which are generated on the way between image data in a form of page description language (PDL data) and data in a bitmap form (bitmap data) obtained by interpreting the PDL data, and the bitmap data; and a control section configured to monitor a first event that the intermediate data stored in the common storage area have been deleted and a second event that the bitmap data stored in the common storage area have been deleted, and to determine presence or absence of area for the intermediate data to be stored when either of the first and second events occurs.

In the image forming apparatus, preferably, the control section comprises: an intermediate data generation unit configured to generate the intermediate data that are generated on the way between the image data and the bitmap data based on the PDL data; a bitmap data generation unit configured to generate the bitmap data based on the intermediate data generated by the intermediate data generation unit, and to delete the intermediate data corresponding to the generated bitmap data; and a print control unit configured to output the bitmap data generated by the bitmap data generation unit to an image forming unit to form an image on a recording medium, and to delete the output bitmap data, wherein the intermediate data generation unit determines whether an area exists in the common storage area for the intermediate data generated by the intermediate data generation unit, to be stored, and in case that the determination results in no area, the existence of area for storing the intermediate data is again determined when either of the first event and the second event occurs; the first event that the intermediate data have been deleted by the bitmap data generation unit, and the second event that the bitmap forms of data have been deleted by the print control unit.

An image forming method reflecting an embodiment according to a second aspect of the invention comprises: a control process with use of a memory section having a common storage area that temporarily stores data in an intermediate form (intermediate data), which are generated on the way between image data in a form of page description language (PDL data) and data in a bitmap form (bitmap data) obtained by interpreting the PDL data, and the bitmap data, the control process monitoring a first event that the intermediate data stored in the common storage area have been deleted and a second event that the bitmap data stored in the common storage area have been deleted, and determining presence or absence of area for the intermediate data to be stored when either of the first and second events occurs.

In the image forming method, preferably, the control process comprises: an intermediate data generation step generating the intermediate data that are generated on the way between the image data and the bitmap data based on the image data in the form of page description language; a bitmap data generation step generating the bitmap data based on the intermediate data generated by the intermediate data generation unit, and to delete the intermediate data in corresponding to the generated bitmap data; and a print control step outputting the bitmap data generated by the bitmap data generation unit to an image forming unit to form an image on a recording medium, and to delete the output bitmap data, and the intermediate data generation step determines whether an area exists in the common storage area for the intermediate data generated by the intermediate data generation unit, to be stored, and when the determination results in no area, the existence of area for storing the intermediate data is again determined when either of the first event and the second event occurs; the first event that the intermediate data have been deleted by the bitmap data generation step, and the second event that the bitmap data have been deleted by the print control step.

A recording medium reflecting an embodiment according to a third aspect of the invention has: a program recorded thereon, which has a common storage area that temporarily stores data in an intermediate form (intermediate data) which are generated on the way between image data in a form of page description language (PDL data) and data in a bitmap form (bitmap data) obtained by interpreting the PDL data, and the bitmap data, the program having the computer function as a control section for: monitoring a first event that the intermediate data stored in the common storage area have been deleted and a second event that the bitmap data stored in the common storage area have been deleted, and determining presence or absence of area for the intermediate data to be stored when either of the first event and the second event occurs.

In the recording medium having the program, preferably, the control section functions as: an intermediate data generation unit configured to generate the intermediate data that are generated on the way between the image data and the bitmap data based on the image data in the form of page description language; a bitmap data generation unit configured to generate the bitmap data based on the intermediate data generated by the intermediate data generation unit, and to delete the intermediate data corresponding to the generated bitmap forms of data; and a print control unit configured to output the bitmap data generated by the bitmap data generation unit to an image forming unit to form an image on a recording medium, and to delete the output bitmap data, and the intermediate data generation unit determines whether an area exists in the common storage area for the intermediate data generated by the intermediate data generation unit, to be stored, and in case that the determination results in no area, the existence of area for storing the intermediate data is again determined when either of first and second events occurs; the first event that the intermediate data have been deleted by the bitmap data generation unit, and the second event that the bitmap forms of data have been deleted by the print control unit.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein:

FIG. 7A shows an example of a state of common storage area 123 in which the capacity of the actual empty area is compared with the threshold value at step S21 while the fourth page of intermediate data M4 is generated from each object;

FIG. 7B shows an example of a state in which the area of intermediate data m4 of a certain object in the fourth page generated at step S12 is subtracted from the estimated empty area, and the subtracted capacity is compared with the threshold value at step S28;

FIG. 9A shows an example of the common storage area 123 in a state that the total capacity of empty areas is compared with the threshold value at step S21 when there has been generated intermediate data m4 for a certain object in a fourth page;

FIG. 9B shows an example of a state in which the area of intermediate data m4 generated at step S12 is subtracted from the estimated empty area, and the subtracted capacity is compared with the threshold value at step S28;

FIG. 9C shows an example of a state in which the capacity of the actual empty area E1 set as a set storing area is compared with the total capacity set as a storing candidate area including the actual empty area E2 and the bitmap data B1;

DETAILED DESCRIPTION OF THE PREFERRED EMBODIMENT

Hereinafter, the preferred embodiment of the invention will be described in detail with reference to the accompanying drawings.

First, the structure of an apparatus will be explained.

Figure 1:
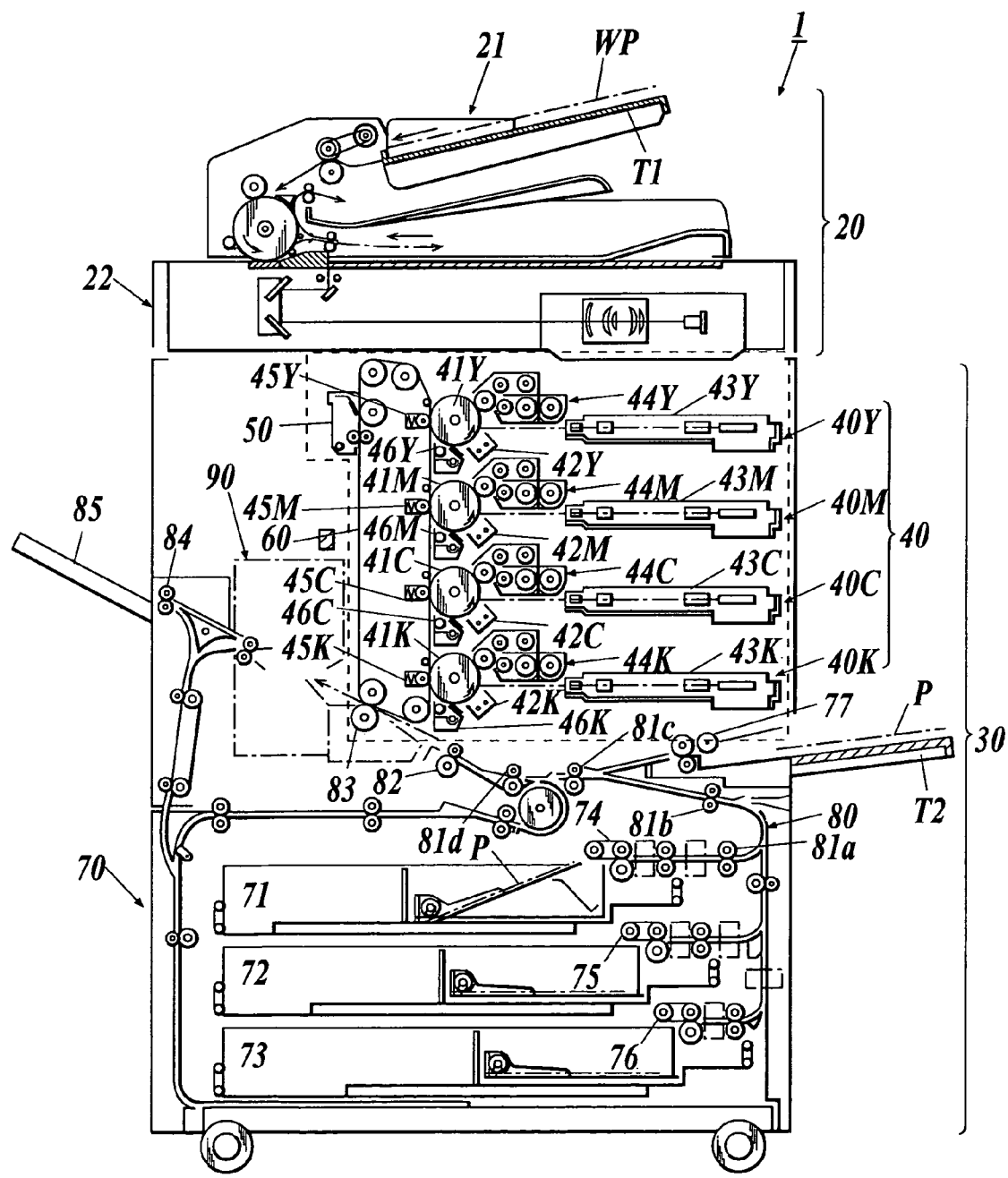
FIG. 1 is a cross-sectional schematic view showing the structure of an image forming apparatus 1 according to an embodiment of the present invention.

FIG. 1 is a cross-sectional schematic view showing the structure of an image forming apparatus 1 according to an embodiment of the invention.

The image forming apparatus 1 is a digital multifunction machine having a copying function, printing function and the like. The copying function reads an image from a reading object of document WP (hereinafter referred to as a "document"), and forms an image on a recording medium P, such as a sheet of paper as a processing object sheet, based on the read image. The printing function receives image data from a personal computer or the like, forms an image on a recording medium P based on the received image and outputs it. As shown in FIG. 1, the image forming apparatus 1 includes an image reader unit 20, and a printer unit 30.

The image reader unit 20 has an automatic document feeding part 21, and a reader part 22.

The automatic document feeding part 21 is called an ADF (auto document feeder), which feeds documents WP stacked on a document tray T1 to the reader part 22 sheet by sheet.

The reader part 22 is constructed as a scanner having a light source, lenses, contact glass, image sensor and the like. The image on the document WP is read such that reflected light of the light irradiating the document is converged and converted photo-electrically, and output to the printer unit 30. Here, the image includes not only image data of pictures, photographs and the like, but also text data of characters, symbols and the like.

The printer unit 30 includes image forming section 40, cleaning device 50, intermediate transferring belt 60, paper feed section 70, conveying part 80, and fixing device 90.

The image forming section 40 includes image forming parts 40Y, 40M, 40C and 40K for respective colors of yellow (Y), magenta (M), cyan (C) and black (K). For example, the image forming part 40Y includes charging device 42Y, exposing device 43Y, developing device 44Y, primary transfer roller 45Y and cleaning device 46Y, which are arranged around a photoreceptor drum 41Y for forming an image of yellow color.

Specifically, the photoreceptor drum 41Y is charged by the charging device 42Y, and irradiated by the light according to an image data for yellow from the exposing device 43Y to form a latent image. The developing device 44Y makes a charged yellow toner adhere to the surface of the photoreceptor drum 41Y having the latent image formed thereon to develop the latent image. As the photoreceptor drum 41Y, on which the toner is attached by the developing device 44Y, rotates at constant speed, the image is transferred onto the intermediate transferring belt 60 at a transfer position where a primary transfer roller 45Y is arranged, which will be explained later. After the toner has been transferred onto the intermediate transferring belt 60, the cleaning device 46Y removes residual charge and residual toner on the surface of the photoreceptor drum 41Y.

Similarly, the image forming parts 40M, 40C and 40K include, respectively, charging devices 42M, 42C and 42K, exposing devices 43M, 43C and 43K, developing devices 44M, 44C and 44K, primary transfer rollers 45M, 45C and 45K, and cleaning devices 46M, 46C and 46K, which are arranged around photoreceptor drums 41M, 41C and 41K, respectively, for forming respective images of magenta, cyan and black colors.

The intermediate transferring belt 60 is a semi-conductive endless belt rotatably supported passing around a plurality of rollers, and driven with rotation of the rollers.

The intermediate transferring belt 60 is pressed against the photoreceptor drums 41Y, 41M, 41C and 41K by the primary transfer rollers 45Y, 45M, 45C and 45K, respectively. With this, toners developed on the surfaces of the photoreceptor drums 41Y, 41M, 41C and 41K are transferred onto the intermediate transferring belt 60 at the transfer positions by the primary transfer rollers 45Y, 45M, 45C and 45K, respectively, and toners of yellow, magenta, cyan and black colors are sequentially transferred and superposed onto the recording medium P at a transfer position by a secondary transfer roller 83.

The paper feed section 70 includes a plurality of paper cassettes 71, 72 and 73, and a manual insertion tray T2. Each of the paper cassettes 71, 72 and 73 accommodates standardized size of recording mediums P, each cassette being previously identified by the size and paper kind. Each of paper feed rollers 74, 75 and 76 feeds the accommodated recording mediums P from the uppermost one sheet by sheet toward the conveying part 80. Various sizes of recording mediums P different from standardized ones can be stacked on the manual insertion tray T2, every time a user needs them. The stacked recording medium P is fed by a paper feed roller 77 sheet by sheet from the uppermost sheet toward the conveying part 80.

The conveying part 80 conveys the recording medium P fed from the paper cassettes 71, 72, 73 and the manual insertion tray T to the secondary transfer roller 83 through a plurality of intermediate rollers 81a, 81b, 81c, 81d and a registration roller 82. The secondary transfer roller 83 collectively transfers the toner image, which has been transferred on the intermediate transferring belt 60, onto the surface of the recording medium P.

The recording medium P, on which the toner image has been transferred, is positioned at the fixing device 90, so that the toner image transferred on the recording medium P is thermally fixed. The recording medium P applied the fixing process thereto is pinched by discharging rollers 84 to be output to a discharging tray 85.

After the toner image has been transferred to the recording medium P by the secondary transfer roller 83, the recording medium P is separated from the intermediate transferring belt 60 with curvature and electrostatic force, and the cleaning device 50 removes the residual toner on the belt 60.

Figure 2:
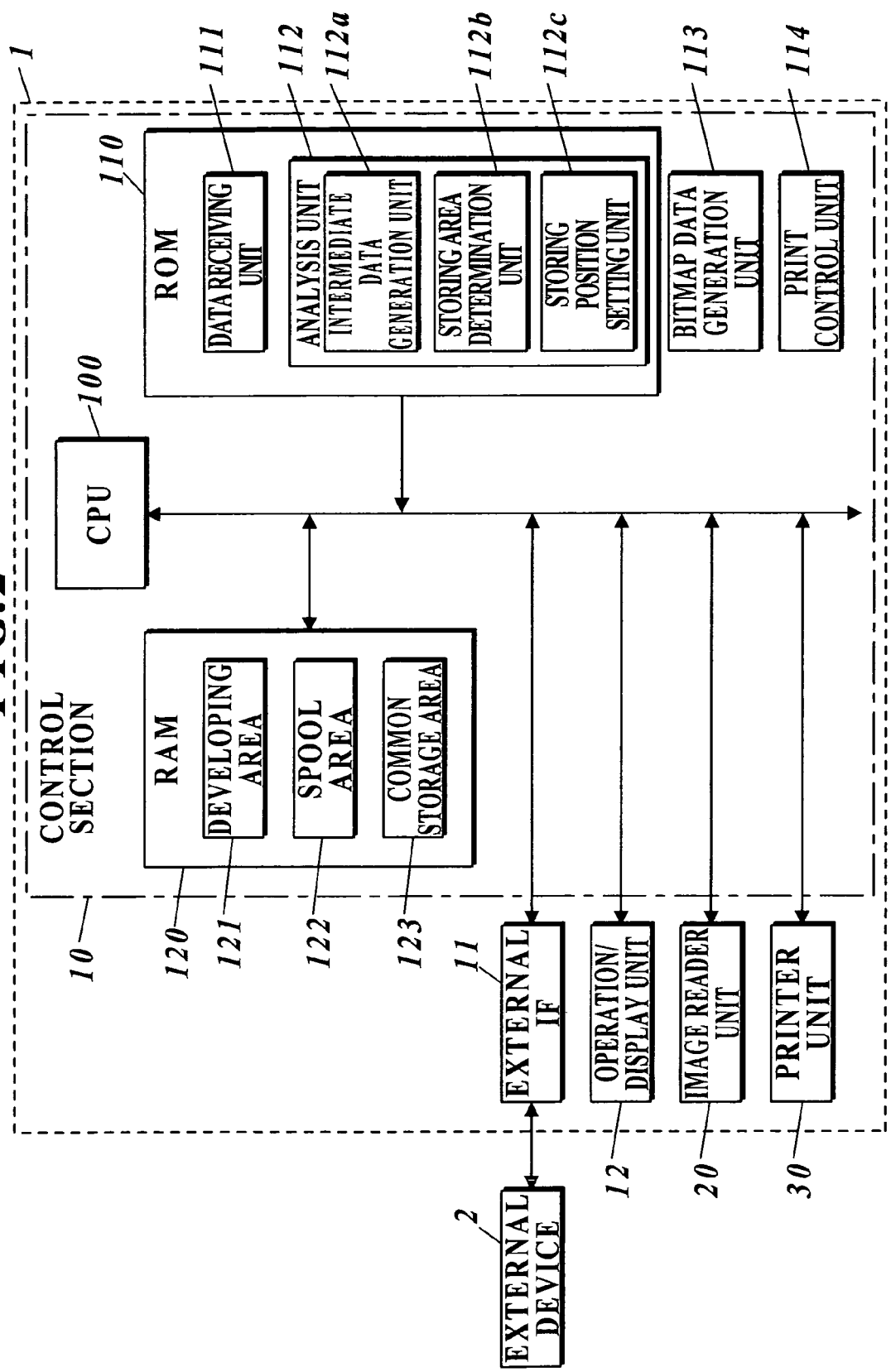
FIG. 2 is a block diagram showing control of the image forming apparatus 1.

FIG. 2 shows a control block diagram of the image forming apparatus 1.

As shown in FIG. 2, the image forming apparatus 1 includes control section 10, external IF (interface) 11, operation/display unit 12, image reader unit 20 and printer unit 30. Each element is connected with each other by a bus or the like, and can communicate with an external device 2 through the external IF 11. Elements which are the same corresponding elements as described in FIG. 1 are designated by the same reference numerals or symbols and the description thereof will be omitted.

The control section (simply, "controller") 10 includes CPU (central processing unit) 100, ROM (read only memory) 110 and RAM (random access memory) 120, develops various programs and data stored in the ROM 110 into the RAM 120, and performs centralized control for operation of each part of the image forming apparatus 1 based on the programs. For instance, according to a command signal input from the operation/display unit 12 or the external device 2, the controller 10 changes its operation mode to a copy mode, a print mode or a scanner mode, reads a processing program for each mode, and performs copying, printing or image data reading control.

The CPU 100 implements the following function in cooperation with ROM 110 and RAM 120. When CPU 100 interprets image data in a form of page description language (hereinafter, "PDL data"), the PDL including PostScript (TM), PCL and the like, generates data in an intermediate form (hereinafter, "intermediate data") between the image data and data in a bitmap form (hereinafter, "bitmap data"), and stores it into a common storage area 123, CPU 100 determines existence of an area for storing the intermediate data into the common storage area 123. When the determined result shows "no existence", CPU 100 watches an event that other intermediate data stored in the common storage area 123 have been deleted and an event that bitmap data stored in the common storage area 123 have been deleted, and when either of the events occurs, CPU 100 determines again existence of an area for storing the intermediate data.

The intermediate data are data generated according to features of objects (text data, graphics data, image data, etc.). For instance, vector form of data may be used as the intermediate data for text data and graphics data, and image form of data as the intermediate data for image data.

The CPU 100 further implements the following function in cooperation with ROM 110 and RAM 120. When CPU 100 stores the intermediate data into the common storage area 123, when empty-area capacity larger than a predetermined threshold value does not exist in the common storage area 123, CPU 100 deems the capacity of at least either intermediate data or bitmap data, which are determined expected to be deleted for at least either the intermediate data or the bitmap data stored in the common storage area 123, as empty-area capacity. The intermediate data are stored into an empty area so that total capacity of the empty area and the area contiguous to the empty area, which is an empty or empty-deemed area of at least either the contiguous intermediate data or bitmap data, becomes smallest.

The ROM 110 stores various processing programs associated with image forming, data associated with image forming, and data to be processed by the various programs. The ROM 110 includes a data receiving unit 111, an analysis part 112, a bitmap data generation unit 113 and a print control unit 114, which store programs and data for implementing the present embodiment in cooperation with CPU 100 and RAM 120.

The data receiving unit 111 stores programs and data for implementing a function of receiving image data from the external device 2 through the external IF 11 and storing the data into a spool area 122 in the RAM 120.

The analysis part 112 includes an intermediate data generation unit 112a, a storing area determination unit 112b and a storing position setting unit 112c.

The intermediate data generation unit 112a stores programs and data for implementing a function of reading PDL data stored in the spool area 122 in RAM 120, generating an intermediate data having a form between the read PDL data and bitmap data, and storing the data into the common storage area 123 in RAM 120.

The storing area determination unit 112b stores programs and data for implementing functions of, when checking whether the intermediate data generated by the intermediate data generation unit 112a is possible or not to be stored into the common storage area 123 and there is not an empty area larger than a predetermined threshold value: determining whether at least either of the intermediate data or the bitmap data stored in the common storage area 123 is expected to be deleted; and deeming as an empty area at least either area of the intermediate data or the bitmap data that is determined expected to be deleted.

The storing position setting unit 112c stores programs and data for implementing a function, when checking whether the intermediate data generated by the intermediate data generation unit 112a is possible to be stored into the common storage area 123; the intermediate data is stored into an empty area so that total capacity of an empty area in the common storage area 123 and the area contiguous to the empty area, which is an empty or empty-deemed area, becomes smallest.

The bitmap data generation unit 113 stores programs and data for implementing a function of executing a rasterizing process for generating bitmap data based on the intermediate data generated by the intermediate data generation unit 112a and stored in the common storage area 123, and deleting (releasing) the intermediate data corresponding to the generated bitmap data from the common storage area 123.

The print control unit 114 stores programs and data for implementing a function of outputting the bitmap data generated by the bitmap data generation unit 113 to the printer unit 30 for forming an image on a recording medium, and deleting (releasing) the output bitmap data.

Meanwhile, the ROM 110 may be configured by a magnetic or optical storage medium or a semiconductor memory as long as it is a readable and nonvolatile recording medium. Further, the ROM 110 may be fixedly mounted on a control board, or detachably mounted.

The RAM 120 includes a developing area 121, the spool area 122 and the common storage area 123 for storing data associated with image formation, data processed by various programs, and the like.

The developing area 121 is an area in which various programs and data stored in the ROM 110 are developed. The spool area 122 is an area that stores various data input from the outside, the data as in image data input from the external device 2 or the image reader unit 20.

The common storage area 123 is a storage area that temporarily stores intermediate data and bitmap data in common, where the intermediate data is stored in the common storage area 123 from an upper address toward a lower address, and the bitmap data from a lower address toward an upper address. The intermediate data are determined the possibility to be stored in the common storage area 123 using a previously set threshold value, but the bitmap data can be stored without limitation.

Thus, the RAM 120 includes the common storage area 123.

Meanwhile, the RAM 120 may be configured with, but not limited to, an HDD (hard disk drive), an MRAM (magnetic random access memory), a flash memory or the like, as long as it is a readable-writable storage medium. Further, the RAM 120 may be fixedly mounted on a control board, or detachably mounted.

The external IF 11 is a communication interface, such as a NIC (network interface card) or a modem, for connecting to a network N like a LAN, and receives PDL data and the like from the external device 2. The PDL data and the like are output to the controller 10.

The operation/display unit 12 includes an LCD (liquid crystal display), a touch panel mounted to cover the LCD, and an operation key group. Various setting screens and various processed results are displayed on the LCD according to display signals input from the controller 10, and also operation signals, which are input from the operation key group or the touch panel, are output to the controller 10.

Next, the operation of the embodiment will be described.

Figure 3:
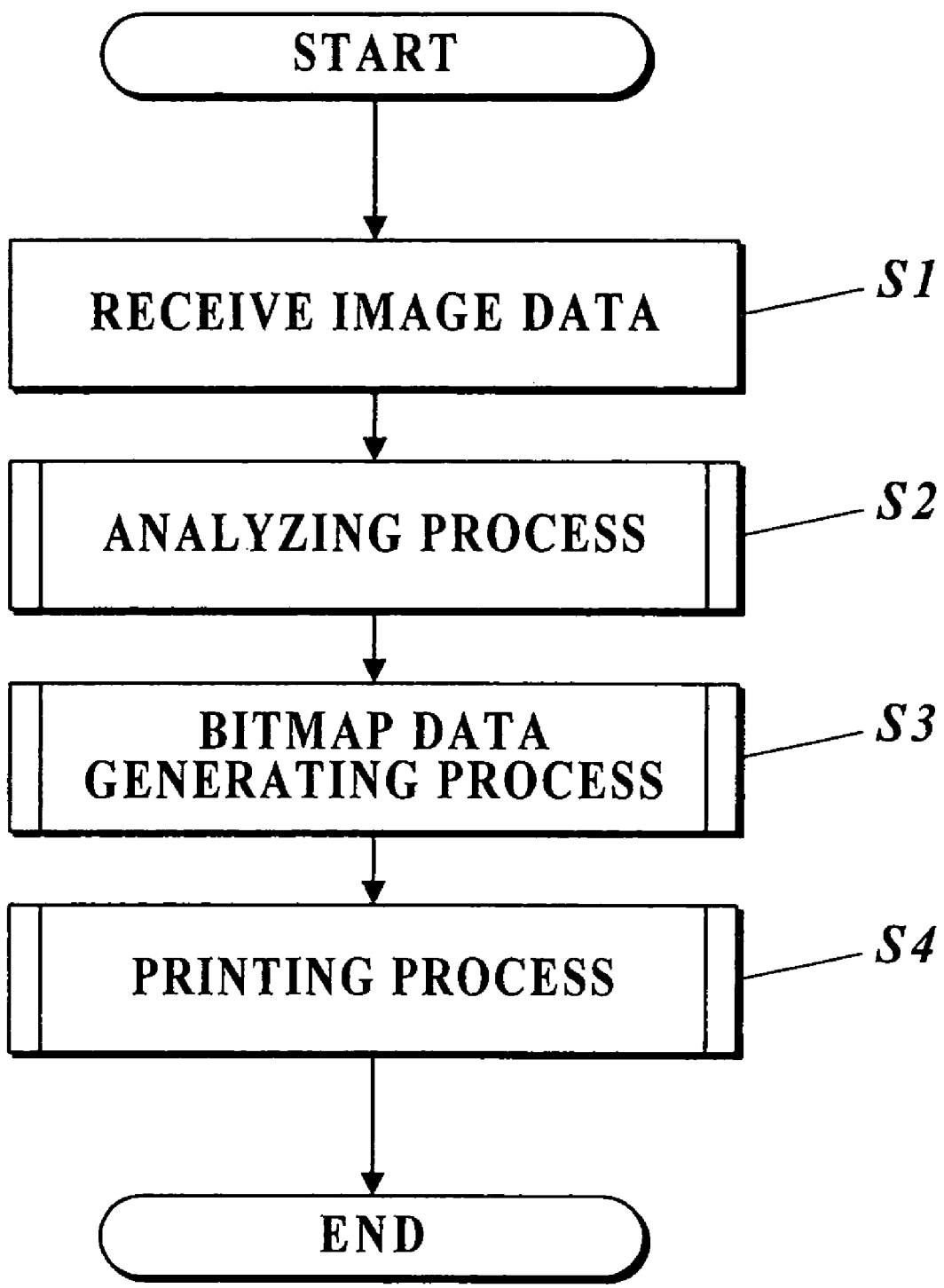
FIG. 3 is a main flowchart showing control processing of a common storage area at the time of printing according to the embodiment of the invention.

FIG. 3 is a main flowchart showing control processing of the common storage area 123 at the time of printing according to the embodiment. The operation shown in FIG. 3 is performed by CPU 100. A description will be given of processing for forming one page of image on a recording medium to simplify the description.

The data receiving unit 111 implements data receive processing in which CPU 100 receives PDL data input through the external interface 11 and stores the data into the spool area 122 (step S1).

After the PDL data is stored into the spool area 122, CPU 100 reads out the PDL data stored in the spool area 122 to generate intermediate data and store into the common storage area 123, thus executing an analyzing process according to the analysis part 112 (step S2).

After one page of intermediate data is stored into the common storage area 123, according to the bitmap data generation unit 113, CPU 100 executes a rasterizing process of generating bitmap data by a band unit based on the one page of intermediate data read from the common storage area 123 to generate one page of bitmap data, and stores the generated bitmap data into the common storage area 123 (step S3).

After the one page of bitmap data are stored into the common storage area 123, according to the print control unit 114, CPU 100 reads out the one page of bitmap data from the common storage area 123 and outputs to the printer unit 30 to form one page of image on the recording medium P (step S4), and the process ends.

The image forming apparatus 1 of the embodiment can perform each step of process of the above-described operation in a parallel manner. In case of forming plural pages of images on a plurality of recording mediums, a priority order is set to each process, and an order of processes to be executed is exchanged according to the set order. As an example of the priority order, the order is set to, from a higher priority, the data receiving process of step S1, the printing process of step S4, the rasterizing process of step S3 and the intermediate data generating process of step S2. Thus, the order is set such that the process for forming an image on a recording medium can have a higher priority.

Figure 4:
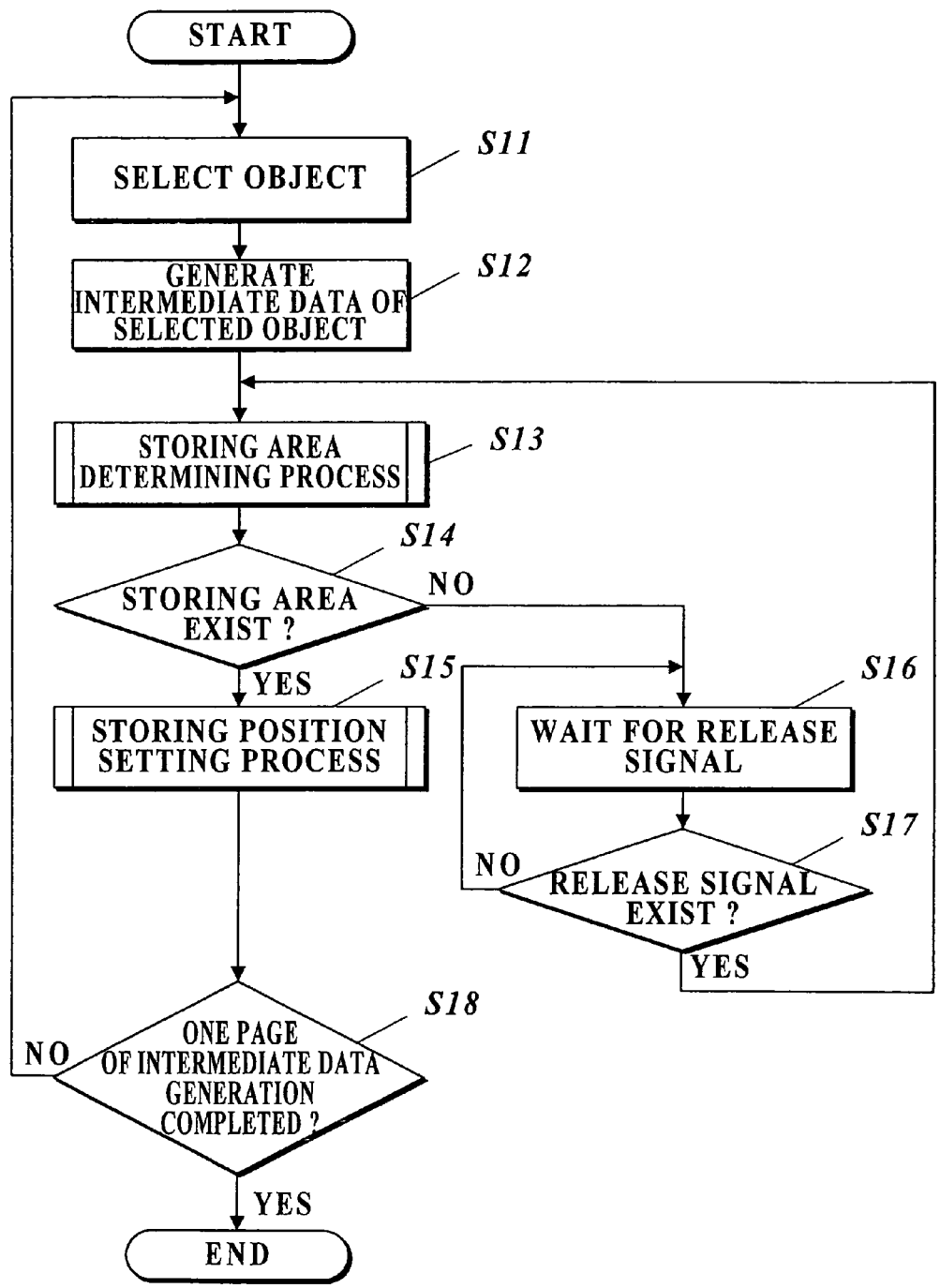
FIG. 4 is a flowchart showing an analyzing process executed at step S2.

FIG. 4 shows a flowchart of the analyzing process executed by step S2. The operation shown in FIG. 4 is the analyzing process that generates one page of intermediate data and stores the data into the common storage area 123, the operation being executed by CPU 100 according to the intermediate data generation unit 112a of the analysis part 112.

CPU 100 selects an object from one page of PDL data stored in the spool area 122 (step S11), and generates intermediate data based on the selected object (step S12).

CPU 100 executes a storing area determining process for determining whether the common storage area 123 has an area for the intermediate data generated at step S12 to be stored in view of the capacity of the generated intermediate data (step S13).

As a result of executing the storing area determining process, CPU 100 checks whether the process determines the existence of an area for the intermediate data to be stored (step S14).

When determined that an area for the intermediate data to be stored exists ("Yes" at step S14), CPU 100 executes a storing position setting process for setting an area for the intermediate data to be store in the common storage area 123, and storing the data (step S15).

When determined that an area for the intermediate data to be stored does not exist ("No" at step S14), CPU 100 waits for a chance to determine the existence of an area for the intermediate data to be stored, that is, the time when a signal showing an event (hereinafter, "release signal"), is generated, the event that the data stored in the common storage area 123 (intermediate data or bitmap data) have been deleted (released) from the common storage area 123 (step S16), and checks whether a release signal is generated (step S17).

When CPU 100 determines that a release signal is not generated ("No" at step S17), the process returns to step S16, and when determined that a release signal is generated ("Yes" at step S17), the process returns to step S13.

After the storing position setting process has been executed, CPU 100 determines whether generation of one page of intermediate data has been completed (step S18). When determined not completed ("No" at step S18), the process returns to step S11.

When determined to be completed ("Yes" at step S18), the process ends.

Figure 5:
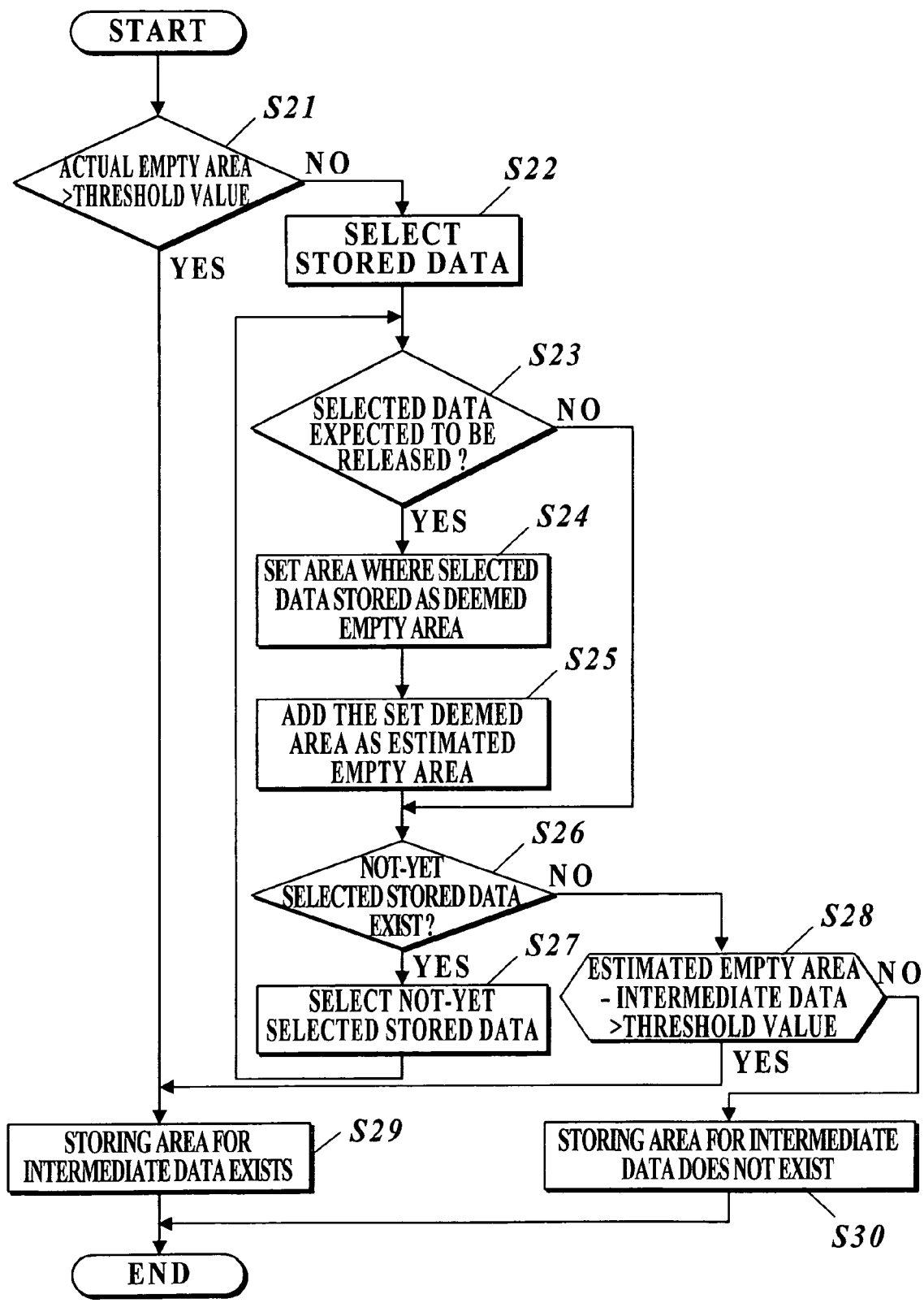
FIG. 5 is a flowchart showing a storing area determining process executed at step S13.

FIG. 5 shows a flowchart of the storing area determining process executed at step S13. The operations shown in FIG. 5 are executed by CPU 100 according to the storing area determination unit 112b.

CPU 100 calculates total capacity of empty areas where data (intermediate data or bitmap data) are not stored (hereinafter, "actual empty area") in the common storage area 123, and checks whether the calculated total capacity of the actual empty area is larger than a predetermined threshold value (step S21).

When CPU 100 determines that the total capacity of the actual empty area is not larger than the predetermined threshold value ("No" at step S21), CPU 100 selects data stored in the common storage area 123 (step S22), and then checks whether the selected data is expected to be deleted (expected to be released) (step S23).

The determination at step S23 as to whether the selected data is expected to be deleted includes, for example, a determination as to whether the selected data are bitmap data generated and stored for only one side of two-sided printing, a determination as to whether not-yet generated intermediate data exist when the data is a part of a plurality of intermediate data generated from each object based on image data in one same page, and a determination as to whether intermediate data having not-yet generated bitmap data exist for generating one page of bitmap data when the intermediate data is a part of a plurality of intermediate data generated from each object based on image data in one same page.

When CPU 100 determines that the selected data is expected to be released from the common storage area 123 ("Yes" at step S23), CPU 100 deems and sets the area where the selected data is stored as an actual empty area (step S24). Hereinafter, the area that is deemed as an actual empty area, where the selected data is stored, is referred to as a deemed empty area.

CPU 100 adds the set deemed empty area to the total actual empty area to calculate as a capacity of an estimated empty area (step S25), and then checks whether not-yet selected data exists out of data stored in the common storage area 123 (step S26).

When CPU 100 determines that not-yet selected data exists ("Yes" at step S26), the CPU selects the not-yet selected data stored in the common storage area 123 (step S27), then the process returns to step S23.

When CPU 100 determines that not-yet selected data does not exist ("No" at step S26), the CPU subtracts the capacity of the intermediate data generated at step S12 from the capacity of the calculated estimated empty area, and checks whether the subtracted value is larger than the previously set threshold value (step S28).

When CPU 100 determines that the total capacity of actual empty areas is larger than the predetermined threshold value ("Yes" at step S21), or determines that the subtracted value, which is obtained by subtracting the capacity of the intermediate data generated at step S12 from the capacity of the calculated estimated empty area, is larger than the previously set threshold value ("Yes" at step S28), the CPU determines that an area exists for storing the intermediate data generated at step S12 (step S29), and the process ends.

When CPU 100 determines that the subtracted value, which is obtained by subtracting the capacity of the intermediate data generated at step S12 from the capacity of the calculated estimated empty area, is not larger than the previously set threshold value ("No" at step S28), the CPU determines that an area does not exist for storing the intermediate data generated at step S12 (step S30), and the process ends.

FIGS. 6A and 6B and FIGS. 7A and 7B show examples of the common storage area 123 in case that the storing area determining process shown in FIG. 5 is applied thereto. Let it be assumed in FIGS. 6A and 6B and FIGS. 7A and 7B that capacity of the common storage area is set to 120 MB, and the predetermined threshold value is set to 64 MB.

Figure 6A:
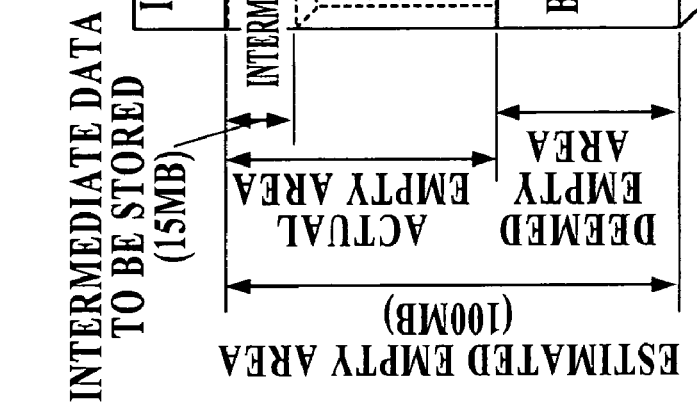
FIG. 6A shows an example of a state of common storage area 123 in which the capacity of the actual empty area is compared with the threshold value at step S21 while the second page of intermediate data M2 is generated from each object.
Figure 6B:
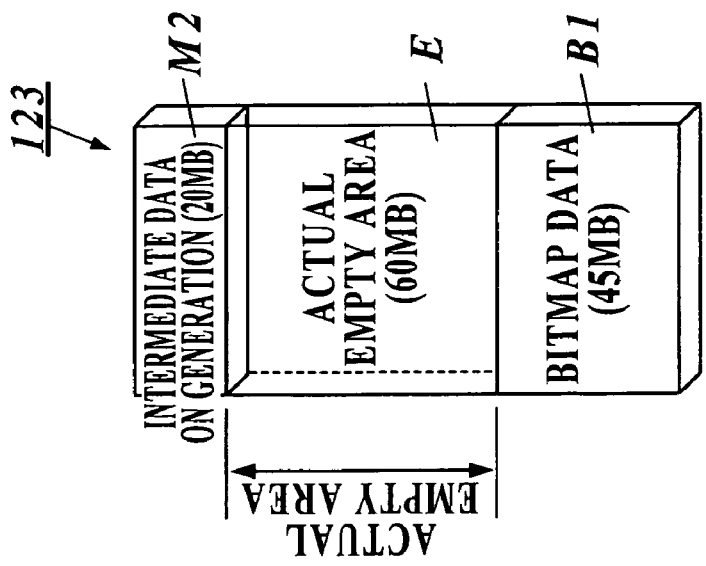
FIG. 6B shows an example of a state in which the area of intermediate data m2 of a certain object in the second page generated at step S12 is subtracted from the estimated empty area, and the subtracted capacity is compared with the threshold value at step S28.

FIGS. 6A and 6B show an example for the case that an area set as a deemed empty area has bitmap data. The common storage area 123 shown in FIGS. 6A and 6B includes, from an upper address, an area occupying 20 MB for second page of intermediate data M2 in the midst of generation from each object, an actual empty area E occupying 60 MB, and an area occupying 40 MB for generation-completed first page of bitmap data B1.

FIG. 6A shows a state of common storage area 123 in which the capacity of the actual empty area is compared with the threshold value at step S21 while the second page of intermediate data M2 is generated from each object. As shown in FIG. 6A, the capacity of the actual empty area (60 MB) is less than the threshold value (64 MB). Accordingly, a program in the past has determined that an area for storing the intermediate data generated at step S12 cannot be secured, and has been in a stand-by state.

The intermediate data M2 shown in FIGS. 6A and 6B are a part of a plurality of intermediate data generated from each object based on the second page of image data and not-yet generated intermediate data exist, and therefore it is not determined at step S23 that the data M2 is expected to be released. To the contrary, the bitmap data B1 is expected to be output as soon as the printer unit 30 becomes ready, and therefore it is determined at step S23 that the data B1 is expected to be released, and the area is set to a deemed empty area. Accordingly, the actual empty area E and the bitmap data B1 set as a deemed empty area are added to figure out an estimated empty area.

FIG. 6B shows a state in which the area of intermediate data m2 of a certain object in the second page generated at step S12 is subtracted from the estimated empty area, and the subtracted capacity-is compared with the threshold value at step S28. As shown in FIG. 6B, the intermediate data m2 generated at step S12 (15 MB) is subtracted from the estimated empty area (100 MB), and the subtracted capacity (85 MB) is larger than the threshold value (64 MB), therefore it is determined that an area exists for storing the intermediate data m2. Accordingly, a next process can be executed without standing by.

FIGS. 7A and 7B show an example for the case that an area set as a deemed empty area has intermediate data. The common storage area 123 shown in FIGS. 7A and 7B includes, from an upper address, an area occupying 30 MB for generation-completed third page of intermediate data M3, an area occupying 10 MB for fourth page of intermediate data M4 in the midst of generation from each object, an actual empty area E occupying 50 MB, and an area occupying 30 MB for third page of bitmap data B3 in the midst of generation based on the third page of intermediate data.

FIG. 7A shows a state of common storage area 123 in which the capacity of the actual empty area is compared with the threshold value at step S21 while the fourth page of intermediate data M4 is generated from each object. As shown in FIG. 7A, the capacity of the actual empty area (50 MB) is less than the threshold value (64 MB). Accordingly, a program in the past has determined that an area for storing the intermediate data generated at step S12 cannot be secured, and has been in a stand-by state.

In the embodiment, the intermediate data M3 are data expected to be released after generation of third page of bitmap data, and therefore it is determined at step S23 that the data M3 is expected to be released, and the area is set to a deemed empty area. The intermediate data M4 are a part of a plurality of intermediate data generated from each object based on the fourth page of image data and not-yet generated intermediate data exist, and therefore it is not determined at step S23 that the data M4 is expected to be released. The bitmap data B3 are in the midst of generation based on the intermediate data M3, and not determined that the data B3 is expected to be released. Accordingly, the actual empty area E and the intermediate data M3 set as a deemed empty area are added to figure out an estimated empty area.

FIG. 7B shows a state in which the area of intermediate data m4 of a certain object in the fourth page generated at step S12 is subtracted from the estimated empty area, and the subtracted capacity is compared with the threshold value at step S28. As shown in FIG. 7B, the intermediate data m4 generated at step S12 (10 MB) is subtracted from the estimated empty area (80 MB), and the subtracted capacity (70 MB) is larger than the threshold value (64 MB), therefore it is determined that an area exists for storing the intermediate data m4. Accordingly, a next process can be executed without standing by.

As described above, when intermediate data are to be stored into the common storage area 123, the capacity of either of intermediate data or bitmap data that are determined to be expected to be deleted can be deemed as an empty-area capacity even if capacity of an actual empty area larger than a predetermined threshold value does not exist in the common storage area 123. Accordingly, it is not necessary for the process to stand by until an actual empty area is produced, which allows resumption of storing process for intermediate data. This can reduce the occurrence rate of stand-by state, and result in improvement of throughput.

Figure 8:
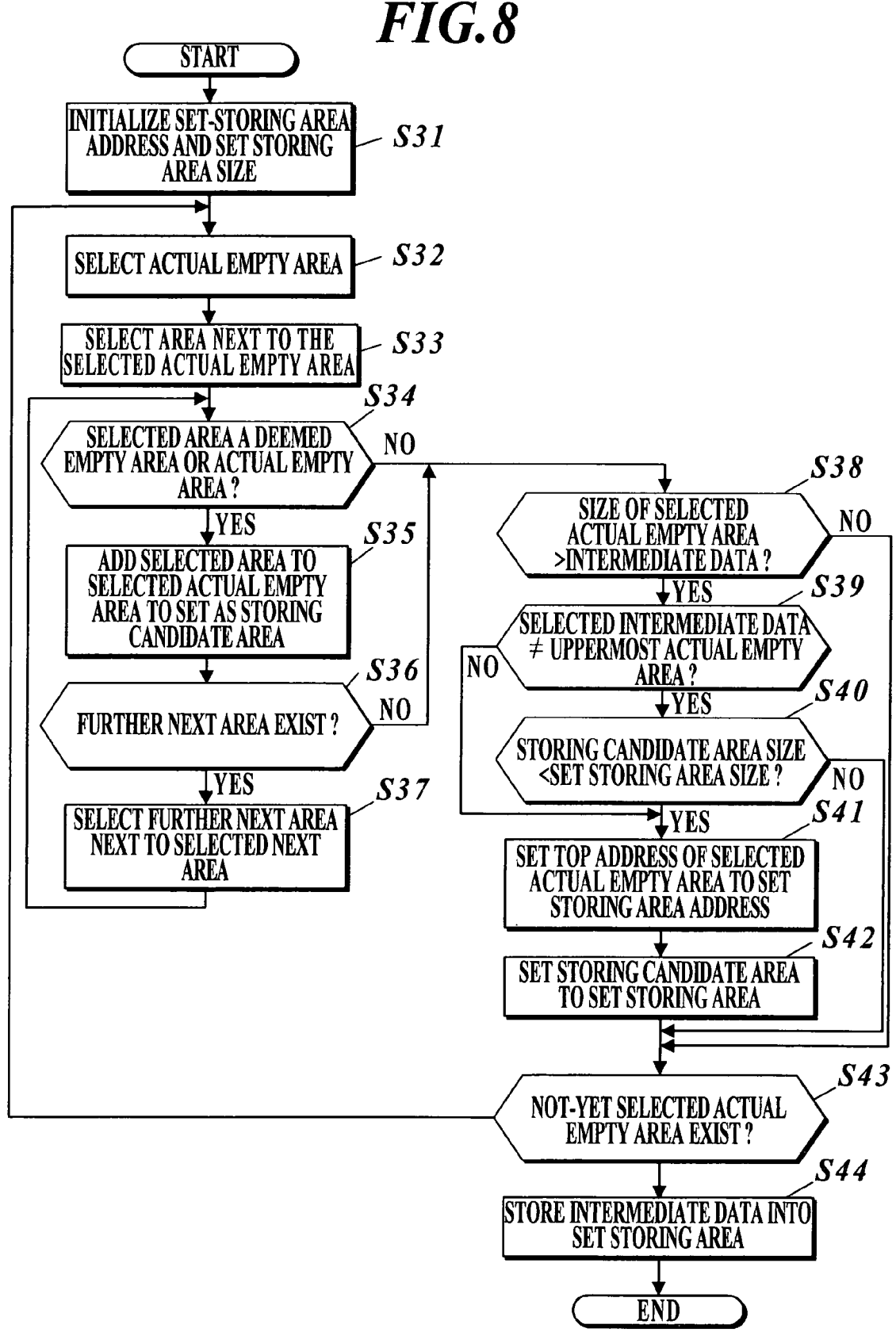
FIG. 8 is a flowchart showing a storing position setting process executed at step S15.

FIG. 8 shows a flowchart of the storing position setting process executed at step S15. The operations shown in FIG. 8 are executed by CPU 100 according to the storing position setting unit 112c.

CPU 100 initializes a top address of an area for intermediate data generated at step S12 to be stored, which is an address in the common storage area 123, (hereinafter, "set storing area address"), as well as capacity of an area for intermediate data generated at step S12 to be stored (hereinafter, "set storing area size") (step S31).

After initializing the set storing area address and the set storing area size, CPU 100 selects an actual empty area (step S32), and further selects a next area continuous with the selected actual empty area, the top address of the next area being lower than that of the actual empty area (step S33).

CPU 100 checks whether the area selected at step S33 is a deemed empty area or an actual empty area (step S34).

When CPU 100 determines that the area selected at step S33 is a deemed empty area or an actual empty area ("Yes" at step S34), the CPU adds the actual empty area selected at step S32 to the area selected at step S33, and sets the added area as a storing candidate area (step S35).

CPU 100 checks whether a next area continuous with the area selected at step S33 exists (step S36). When determined that the next area exists ("Yes" at step S36), CPU 100 further selects the next area continuous with the area selected at step S33 (step S37), and the process returns to step S34.

When CPU 100 determines that the next area does not exist ("No" at step S36), the process proceeds to step S38.

When CPU 100 determines that the area selected at step S33 is neither a deemed empty area nor an actual empty area ("No" at step S34), the CPU checks whether capacity of the actual empty area selected at step S32 is larger than that of the immediate data generated at step S12 (step S38). That is, the CPU checks at step S38 whether the actual empty area selected at step S32 is an area into which the immediate data generated at step S12 can be stored.

When CPU 100 determines that the capacity of the actual empty area selected at step S32 is less than that of the immediate data generated at step S12 ("No" at step S38), the process proceeds to step S43.

When CPU 100 determines that the capacity of the actual empty area selected at step S32 is larger than that of the immediate data generated at step S12 ("Yes" at step S38), the CPU checks whether the actual empty area selected at step S32 is not an actual empty area having the uppermost top address out of actual empty areas within the common storage area 123 (that is, the uppermost actual empty area within the common storage area 123) (step S39).

When CPU 100 determines that the actual empty area selected at step S32 is not an actual empty area having the uppermost top address out of actual empty areas within the common storage area 123 (that is, the uppermost actual empty area within the common storage area 123) ("Yes" at step S39), the CPU checks whether capacity of the storing candidate area is smaller than that of the set storing area (step S40). When the CPU determines that the capacity of the storing candidate area is larger than that of the set storing area ("No" at step S40), the process proceeds to step S43.

When CPU 100 determines that the actual empty area selected at step S32 is an actual empty area having the uppermost top address out of actual empty areas within the common storage area 123 (that is, the uppermost actual empty area within the common storage area 123) ("N" at step S39), or that the capacity of the storing candidate area is smaller than that of the set storing area ("Yes" at step S40), the CPU sets the top address of the actual empty area selected at step S32 as a set storing area address (step S41), and then sets the storing candidate area as a set storing area (step S42).

After the results of "No" at step S38, "No" at step S40, or step S42, CPU 100 checks whether a not-yet selected actual empty area exists in the common storage area 123 (step S43). When the CPU determines that a not-yet selected actual empty area exists in the common storage area 123 ("Yes" at step S43), the process returns to step S32, and When the CPU determines that a not-yet selected actual empty area does not exist in the common storage area 123 ("No" at step S43), the CPU stores the intermediate data generated at step S12 into the set storing area (step S44), and the process ends.

FIGS. 9A, 9B and 9C show an example of the common storage area 123 to which the storing area determining process and the storing position setting process respectively shown in FIGS. 5 and 8 are applied. In FIGS. 9A, 9B and 9C, the capacity of the common storage area 123 is set to 120 MB, and the predetermined threshold value to 64 MB.

The common storage area 123 shown in FIGS. 9A, 9B and 9C includes, in an order from an upper address, generation-completed intermediate data M2 having 20 MB set for a second page of two-sided printing, an actual empty area E1 having 20 MB, generation-completed intermediate data M3 having 20 MB set for a third page of two-sided printing, an actual empty area. E2 having 20 MB, and generation-completed bitmap data B1 having 40 MB set for a first page of single-sided printing.

FIG. 9A shows the common storage area 123 in a state that the total capacity of empty areas is compared with the threshold value at step S21 when there has been generated intermediate data m4 for a certain object in a fourth page. As shown in FIG. 9A, the total capacity of empty areas (40 MB) is not larger than the threshold value (64 MB). Accordingly, a program in the past has determined that an area for storing the intermediate data generated at step S12 cannot be secured, and has been in a stand-by state.

In the common storage area 123 shown in FIGS. 9A, 9B and 9C, it is not determined at steps S22-S27 that the intermediate data M2 and M3 are expected to be released. On the other hand, it is determined that the bitmap data B1 is expected to be released, and the area for the data B1 is set to a deemed empty area. Accordingly, the actual empty areas E1 and E2 and the bitmap data B1 set as a deemed empty area are added to figure out an estimated empty area.

FIG. 9B shows a state in which the area of intermediate data m4 generated at step S12 is subtracted from the estimated empty area, and the subtracted capacity is compared with the threshold value at step S28. As shown in FIG. 9B, the intermediate data m4 generated at step S12 (10 MB) is subtracted from the estimated empty area (80 MB), and the subtracted capacity (70 MB) is larger than the threshold value (64 MB), therefore it is determined that an area exists for storing the intermediate data m4.

When the intermediate data m4 is stored into the common storage area 123 shown in FIGS. 9A, 9B and 9C, a position for the intermediate data m4 to be stored is preferably decided so that a continuous actual empty area can become larger for effectively utilizing the common storage area in later data-store processing. Therefore, as of the operations shown in FIG. 8, actual empty areas for the intermediate data m4 to be stored are checked sequentially from an upper address in the common storage area 123.

In the embodiment, the actual empty area is checked sequentially from an upper address toward lower addresses in the common storage area 123. First, focusing on the actual empty area E1, the intermediate data M3, which is continuous with the area E1 and located at a lower area, is not expected to be released, and therefore the area for the data M3 is neither a deemed empty area nor an actual empty area. Next, the capacity of the empty area E1 is larger than that of the intermediate data m4, therefore it is determined that the data m4 can be stored. Since the actual empty area E1 is an actual empty area locating at the top in the common storage area 123, the area E1 is set to a set storing area.

Next, focusing on the actual empty area E2, the bitmap data B1, which is continuous with the area E2 and located at a lower area, is expected to be released and set to a deemed empty area, therefore the area E2 is added to the data B1, and the added area is set to a storing candidate area. Subsequently, since the capacity of the actual empty area E2 is larger than that of the intermediate data m4, it is determined that the data m4 can be stored. And, the area E2 is not an actual empty area located at the top in the common storage area 123.

FIG. 9C shows a state in which the capacity of the actual empty area E1 set as a set storing area is compared with the total capacity set as a storing candidate area including the actual empty area E2 and the bitmap data B1. As shown in FIG. 9C, the capacity of the storing candidate area (60 MB) is not less than that of the set storing area (20 MB), therefore the intermediate data m4 are stored into the empty area E1 set as a set storing area.

As described above, intermediate data can be stored in such a way that a storing area is selected so that a continuing empty area can have maximum area. With this, scattered storing of data in the common storage area 123 can be reduced, resulting in effective use of the common storage area 123.

Figure 10:
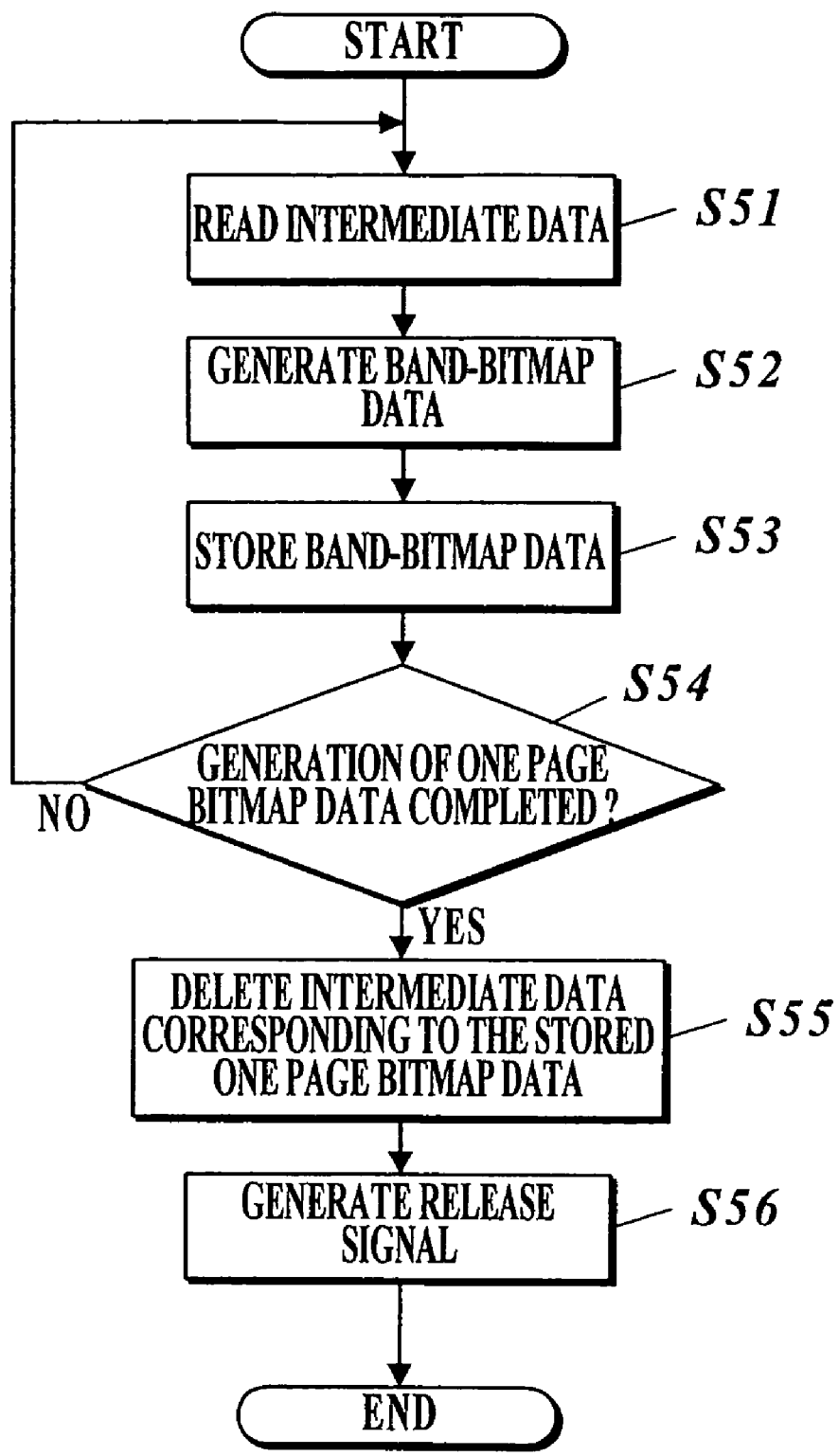
FIG. 10 is a flowchart showing a bitmap data generating process executed at step S3.

FIG. 10 shows a flowchart of the bitmap data generating process executed at step S3. The operations shown in FIG. 10 are executed by CPU 100 according to the bitmap data generation unit 113.

CPU 100 reads out intermediate data generated from each object from the common storage area 123 (step S51), then generates bitmap data based on the read intermediate data. The bitmap data generated based on the intermediate data generated from each object is called band-bitmap data (step S52).

CPU 100 stores the generated band-bitmap data into the common storage area 123 (step S53), and checks whether the generated band-bitmap data have produced one page of bitmap data (step S54).

When CPU 100 determines that the generated band-bitmap data have not produced one page of bitmap data ("No" at step S54), the process returns to step S51.

When CPU 100 determines that the generated band-bitmap data have produced one page of bitmap data ("Yes" at step S54), the CPU deletes (releases) the intermediate data stored in the common storage area 123 as source data corresponding to the one page of bitmap data (step S55).

CPU 100 generates a release signal showing an event that the intermediate data have been deleted from the common storage area 123 (step S56), and the process ends.

Figure 11:
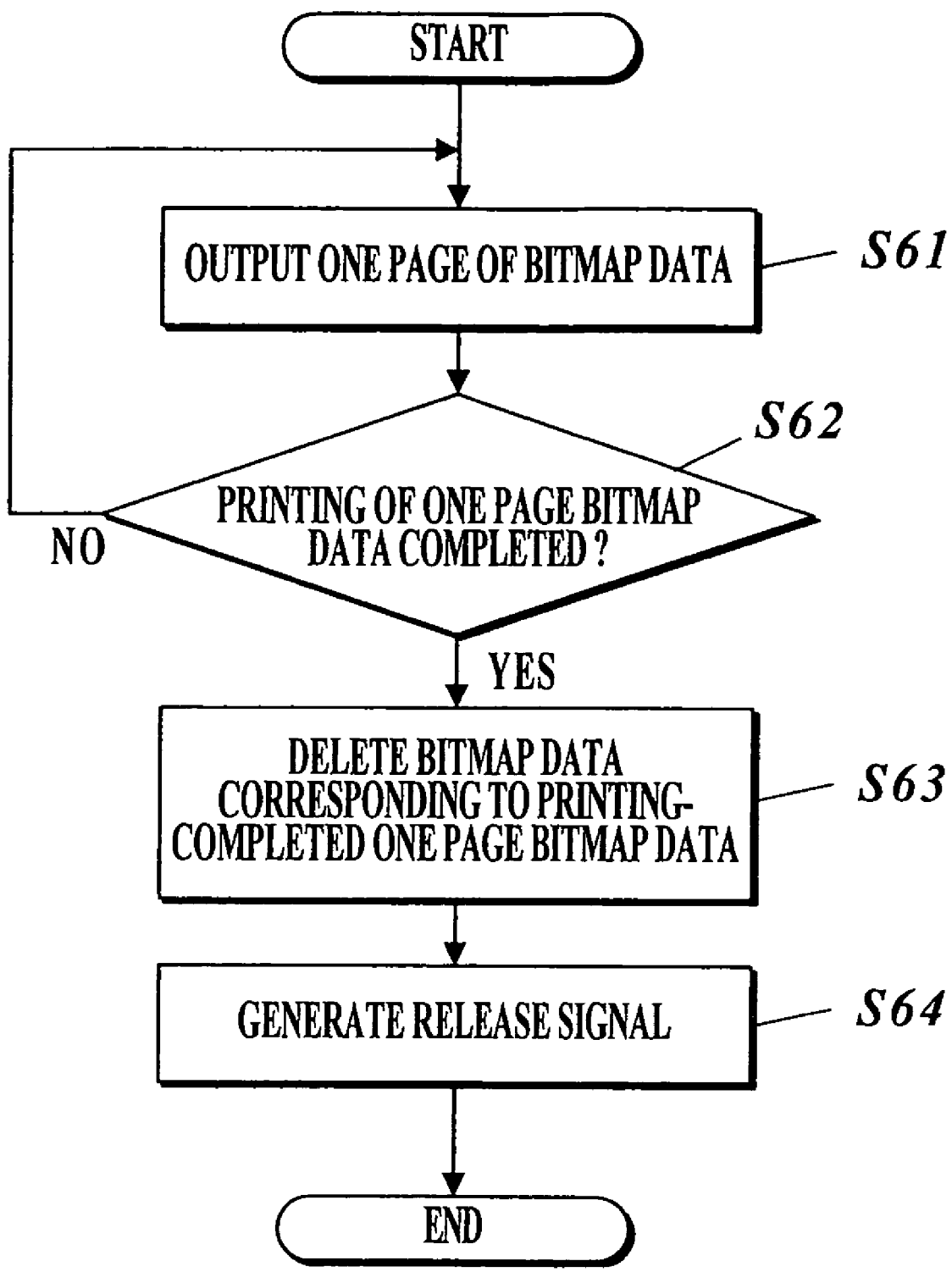
FIG. 11 is a flowchart showing a printing process executed at step S4.

FIG. 11 shows a flowchart of the printing process executed at step S4. The operations shown in FIG. 11 are executed by CPU 100 according to the print control unit 114.

CPU 100 reads out one page of bitmap data from the common storage area, 123, and outputs them to the printer unit 30 (step S61).

CPU 100 checks whether one page of bitmap data has been output to the printer unit 30 to form an image on a recording medium corresponding to the output bitmap data and the medium has been discharged out, that is, checks whether the print processing has been completed according to the one page of bitmap data (step S62).

When CPU 100 determines that the print processing has not been completed according to the one page of bitmap data ("No" at step S62), the process returns to step S61.

When CPU 100 determines that the print processing has been completed according to the one page of bitmap data ("Yes" at step S62), the CPU deletes (releases) the bitmap data stored in the common storage area 123 and corresponding to the one page of bitmap data that the print processing thereof has been completed (step S63).

CPU 100 generates a release signal showing an event that the bitmap data have been deleted from the common storage area 123 (step S64), and the process ends.

Figure 12A:
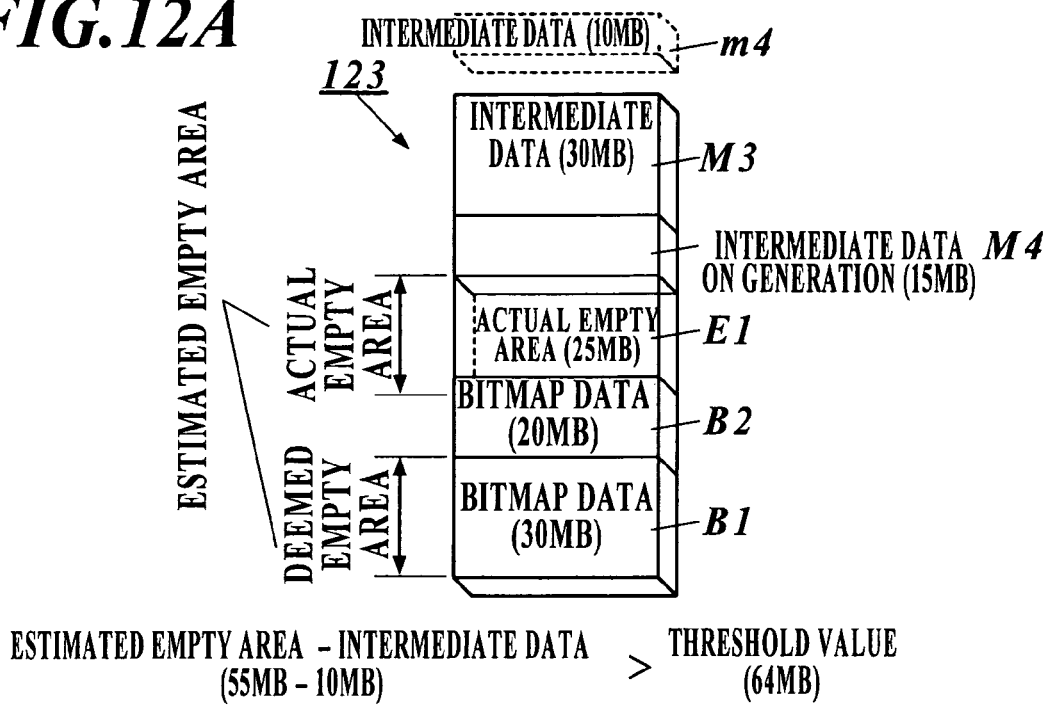
FIG. 12A shows an example of a state in which the area of intermediate data m4 of a certain object in the fourth page generated at step S12 is subtracted from the estimated empty area, and the subtracted capacity is compared with the threshold value in the storing area determining process at step S13.
Figure 12B:
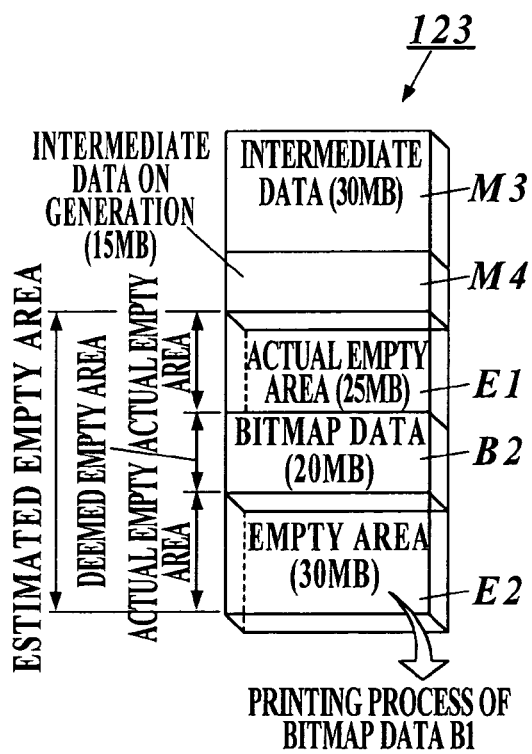
FIG. 12B shows an example of a state in which the printer unit 30 is ready for printing after step S16 in the state of FIG. 12A (after the state of waiting for a release signal) and a release signal has been generated showing an event that the bitmap data B1 has been deleted from the common storage area 123.
Figure 12C:
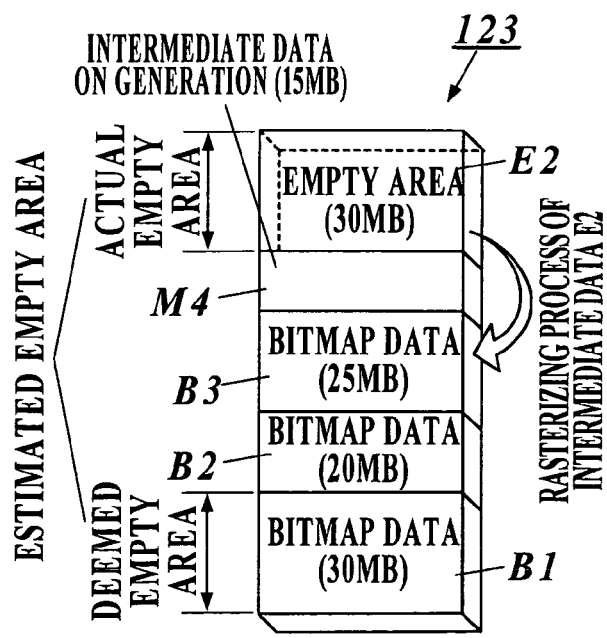
FIG. 12C shows an example of a state after step S16 in the state of FIG. 12A (after the state of waiting for a release signal), in which printing is impossible due to an error occurred in the printer unit 30, such as running out of toner or a case that the recording medium P is not in the paper feed section 70, and a release signal is generated showing an event that the intermediate data M3 have been deleted from the common storage area 123.

FIGS. 12A, 12B and 12C show an example of the common storage area 123 to which the analyzing process shown in FIG. 4 is applied.

In FIGS. 12A, 12B and 12C, the capacity of the common storage area is set to 120 MB, and the predetermined threshold value to 64 MB.

The common storage area 123 shown in FIGS. 12A, 12B and 12C include, in an order from an upper address, an area having 30 MB for generation-completed third page of intermediate data M3, an area having 15 MB for fourth page of intermediate data M4 in the midst of generation from each object, an actual empty area E1 having 25 MB, an area having 20 MB for generation-completed second page of bitmap data B2, and an area having 30 MB for generation-completed first page of bitmap data B1.

FIG. 12A shows a state in which the area of intermediate data m4 of a certain object in the fourth page generated at step S12 is subtracted from the estimated empty area, and the subtracted capacity is compared with the threshold value in the storing area determining process at step S13. As shown in FIG. 12A, the intermediate data m4 generated at step S12 (10 MB) is subtracted from the estimated empty area (55 MB), and the subtracted capacity (45 MB) is smaller than the threshold value (64 MB), therefore it is determined that an area does not exist for storing the intermediate data m4.

In the past, after it has been determined that an area does not exist for storing the intermediate data m4, only one time has been given as the chance to determine the existence of an empty area in the common storage area 123, that is, until the bitmap data stored in the common storage area 123 has been deleted (released). Therefore, when a malfunction occurs in the printer unit for example, the process has stood by for a long time, which causes the throughput to be lowered.

FIGS. 12B and 12C show the states in which a release signal is generated after step S16 in the state of FIG. 12A (after the state of waiting for a release signal). In the embodiment, as for the chance to determine the existence of an area for the intermediate data to be stored with occurrence of a release signal, the apparatus has two chances; one is a chance when the bitmap data stored in the common storage area 123 have been deleted, and the other is a chance when the intermediate data have been deleted, because the bitmap data generating process shown in FIG. 10 and the printing process shown in FIG. 11 are carried out in a multitask manner.

FIG. 12B shows a state in which the printer unit 30 is ready for printing after step S16 in the state of FIG. 12A (after the state of waiting for a release signal) and a release signal has been generated showing an event that the bitmap data B1 has been deleted from the common storage area 123.

As shown in FIG. 12B, when the bitmap data B1 are output to the printer unit 30 and the printing process is completed, the bitmap data B1 is deleted from the common storage area 123, and the area occupied by the bitmap data B1 changes to a new actual empty area E2. Again in the storing area determining process at step S13, the intermediate data m4 generated at step S12 (10 MB) is subtracted from the estimated empty area (75 MB), and the subtracted capacity (65 MB) is compared with the threshold value (64 MB) to determine the existence of an area for the intermediate data m4 to be stored.

FIG. 12C shows a state after step S16 in the state of FIG. 12A (after the state of waiting for a release signal), in which printing is impossible due to an error occurred in the printer unit 30, such as running out of toner or a case that the recording medium P is not in the paper feed section 70, and a release signal is generated showing an event that the intermediate data M3 have been deleted from the common storage area 123.

As shown in FIG. 12C, when the rasterizing process is applied to the intermediate data M3 to generate bitmap data B3, the intermediate data M3 is deleted from the common storage area 123, and the area occupied by the intermediate data M3 changes to a new actual empty area E2. Again in the storing area determining process at step S13, the intermediate data m4 generated at step S12 (10 MB) is subtracted from the estimated empty area (60 MB), and the subtracted capacity (50 MB) is compared with the threshold value (64 MB) to determine the existence of an area for the intermediate data m4 to be stored.

As described above, according to the embodiment, the apparatus can determine the existence of area for the intermediate data to be stored at two chances; one is the time when an event occurs that the intermediate data stored in the common storage area 123 have been deleted, and the other is the time when an event occurs that bitmap data stored in the common storage area 123 have been deleted. Therefore, when it is determined at either chance that the area for the intermediate data to be stored exists, the process for storing the intermediate data can be resumed. Since a plurality of chances occur for determining the existence of area for the intermediate data to be stored, highly efficient use of the common storage area 123 can be achieved, and improvement of throughput can be attained.

Further, in case that the intermediate data is stored in the common storage area 123, even when the actual empty area capacity larger than a predetermined threshold value does not exist in the common storage area 123, areas for deletion-expected data (intermediate data or bitmap data) can be deemed as empty areas in addition to actual empty areas. Therefore, the process does not need to stand by up to actual generation of an empty area and permits the next processing, which allows efficient use of the common storage area 123 and improvement of throughput.

The present U.S. patent application claims a priority under the Paris Convention of Japanese patent application No. 2005-372453 filed on Dec. 26, 2005, and is entitled to the benefit thereof for a basis of correction of an incorrect translation.

What is claimed is:

1. An image forming apparatus comprising:
a memory section having a common storage area that temporarily stores (i) data in an intermediate form as intermediate data, which are generated between image data in a form of page description language (PDL) data and bitmap data in a bitmap form, wherein the intermediate data is obtained by interpreting the image data, and (ii) the bitmap data in the bitmap form; and
a control section configured to monitor a first event that the intermediate data stored in the common storage area have been deleted and a second event that the bitmap data stored in the common storage area have been deleted, and to determine presence or absence of an area for the intermediate data to be stored when either of the first and second events occurs.

2. The image forming apparatus of claim 1, wherein the control section comprises:
an intermediate data generation unit configured to generate the intermediate data between the PDL data and the bitmap data based on the PDL data;
a bitmap data generation unit configured to generate the bitmap data based on the intermediate data generated by the intermediate data generation unit, and to delete the intermediate data corresponding to the generated bitmap data; and
a print control unit configured to output the bitmap data generated by the bitmap data generation unit to an image forming unit to form an image on a recording medium, and to delete the output bitmap data;
wherein the intermediate data generation unit determines whether an area exists in the common storage area for the intermediate data generated by the intermediate data generation unit to be stored, and in case that the determination results in no area, the existence of the area for storing the intermediate data is again determined when either of the first event and the second event occurs; and
wherein the first event indicates that the intermediate data have been deleted by the bitmap data generation unit, and the second event indicates that the bitmap data have been deleted by the print control unit.

3. The image forming apparatus of claim 2, wherein the control section deletes the intermediate data stored in the common storage area when the control section determines that one page of bitmap data has been produced.

4. The image forming apparatus of claim 2, wherein the control section deletes the bitmap data stored in the common storage area when the control section determines that image forming has been completed according to one page of bitmap data.

5. The image forming apparatus of claim 2, wherein the control section checks whether data stored in the common storage area is expected to be deleted.

6. The image forming apparatus of claim 5, wherein the control section sets the data expected to be deleted as an empty area.

7. An image forming control method that is operable with a memory section having a common storage area that temporarily stores (i) data in an intermediate form as intermediate data, which are generated between image data in a form of page description language (PDL) data and bitmap data in a bitmap form, wherein the intermediate data is obtained by interpreting the PDL data, and (ii) the bitmap data in the bitmap form, said image forming control method comprising:
monitoring a first event that the intermediate data stored in the common storage area have been deleted and a second event that the bitmap data stored in the common storage area have been deleted, and
determining presence or absence of an area for the intermediate data to be stored when either of the first and second events occurs.

8. The image forming control method of claim 7, wherein the image forming control method comprises:
generating the intermediate data between the PDL data and the bitmap data based on the PDL data;
generating the bitmap data based on the generated intermediate data, and deleting the intermediate data corresponding to the generated bitmap data; and
outputting the generated bitmap data to an image forming unit to form an image on a recording medium, and deleting the output bitmap data,
wherein when generating the intermediate data it is determined whether an area exists in the common storage area for the generated intermediate data to be stored, and when the determination results in no area, the existence of the area for storing the intermediate data is again determined when either of the first event and the second event occurs; and
wherein the first event indicates that the intermediate data have been deleted after the bitmap data has been generated, and the second event indicates that the bitmap data have been deleted after the generated bitmap data has been output to the image forming unit.

9. The image forming control method of claim 8, wherein the intermediate data stored in the common storage area is deleted when it is determined that one page of bitmap data has been produced.

10. The image forming control method of claim 8, wherein the bitmap data stored in the common storage area is deleted when it is determined that image forming has been completed according to one page of bitmap data.

11. The image forming control method of claim 8, further comprising checking whether data stored in the common storage area is expected to be deleted.

12. The image forming control method of claim 11, wherein the data expected to be deleted is set as an empty area.

13. A computer-readable recording medium having a program recorded thereon for controlling an image forming apparatus having a common storage area that temporarily stores (i) data in an intermediate form as intermediate data, which are generated between image data in a form of page description language (PDL) data and bitmap data in a bitmap form, wherein the intermediate data is obtained by interpreting the PDL data, and (ii) the bitmap data, said program controlling the computer to function as a control section for:
   monitoring a first event that the intermediate data stored in the common storage area have been deleted and a second event that the bitmap data stored in the common storage area have been deleted, and
   determining presence or absence of an area for the intermediate data to be stored when either of the first event and the second event occurs.

14. The computer-readable recording medium of claim 13, wherein the program controls the computer to functions as:
   an intermediate data generation unit configured to generate the intermediate data between the PDL data and the bitmap data based on the PDL data;
   a bitmap data generation unit configured to generate the bitmap data based on the intermediate data generated by the intermediate data generation unit, and to delete the intermediate data corresponding to the generated bitmap data; and
   a print control unit configured to output the bitmap data generated by the bitmap data generation unit to an image forming unit to form an image on a recording medium, and to delete the output bitmap data;
   wherein the intermediate data generation unit determines whether an area exists in the common storage area for the intermediate data generated by the intermediate data generation unit to be stored, and in case that the determination results in no area, the existence of the area for storing the intermediate data is again determined when either of first and second events occurs; and
   wherein the first event indicates that the intermediate data have been deleted by the bitmap data generation unit, and the second event indicates that the bitmap data have been deleted by the print control unit.

15. The computer-readable recording medium of claim 14, wherein the program controls the computer to delete the intermediate data stored in the common storage area when it is determined that one page of bitmap data has been produced.

16. The computer readable recording medium of claim 14, wherein the program controls the computer to delete the bitmap data stored the common storage area when it is determined that image forming has been completed according to one page of bitmap data.

17. The computer-readable recording medium of claim 14, wherein the program controls the computer to check whether data stored in the common storage area is expected to be deleted.

18. The computer-readable recording medium of claim 17, wherein the program controls the computer to set the data expected to be deleted as an empty area.

* * * * *